United States Patent [19]

Kubo et al.

[11] Patent Number: 5,527,370
[45] Date of Patent: Jun. 18, 1996

[54] LAPPING COMPOSITION

[75] Inventors: Masaaki Kubo; Koji Nishikawa; Shinji Maruyama, all of Aichi-ken, Japan

[73] Assignee: Fujimi Incorporated, Aichi-ken, Japan

[21] Appl. No.: 261,428

[22] Filed: Jun. 17, 1994

[30] Foreign Application Priority Data

Apr. 15, 1994 [JP] Japan .................................. 6-077595

[51] Int. Cl.$^6$ ...................................................... C09C 1/68
[52] U.S. Cl. ..................... 51/309; 106/3; 501/153
[58] Field of Search ..................... 51/309; 106/3; 501/153

[56] References Cited

U.S. PATENT DOCUMENTS

| | | | |
|---|---|---|---|
| 3,121,623 | 2/1964 | Nesin | 51/293 |
| 5,190,567 | 3/1993 | Tamamaki et al. | 51/293 |
| 5,248,318 | 9/1993 | Tamamaki et al. | 51/309 |
| 5,277,702 | 1/1994 | Thibault et al. | 51/309 |
| 5,296,085 | 3/1994 | Faure et al. | 51/309 |
| 5,300,130 | 4/1994 | Rostoker | 51/309 |
| 5,366,542 | 11/1994 | Yamada et al. | 51/309 |

FOREIGN PATENT DOCUMENTS 1-121164  5/1989  Japan .

*Primary Examiner*—Deborah Jones
*Attorney, Agent, or Firm*—Ladas & Parry

[57] ABSTRACT

A lapping composition which contains abrasive grains which are commercially available and which consists of plate alumina-powder prepared by milling and class:trying a sintered body of plate alumina obtained by calcinating aluminum hydroxide, and other plate alumina powder classified and prepared separately from but similarly to the first-mentioned plate alumina powder having average grain size which is in a range of from 1.3 times to 2.3 times as large as the average grain size of the first-mentioned plate alumina powder. Further provided is a lapping method with such a lapping composition by which the removal rate is improved and a lapped surface excellent in quality can be obtained.

3 Claims, No Drawings

LAPPING COMPOSITION

BACKGROUND OF THE INVENTION

1. Field of the Invention

The present invention relates to a composition used for lapping and to a lapping method, and, particularly, relates to a lapping composition containing milled powder of plate alumina for lapping metals or inorganic materials such as semiconductor monocrystals, various metals, glass plates, lens, quartz and so on, and a lapping method using this lapping composition.

2. Description of the Prior Art

"Lapping" is a grinding process which is performed on the surface of subject to be lapped (work), in advance to finishing into a mirror-like surface through "polishing".

Lapping process is usually performed in a manner such that a work is sandwiched between two, upper and lower cast ion plates, a water slurry of abrasives is fed between the surfaces of plates and the work, and the plates are rotated under pressure.

The purposes of this process are:

(1) to make the thickness uniform;

(2) to eliminate defects on the surface produced by cutting or sawing and to minimize the sub-surface damage layer (the layer in which minute cracks or pits are produced in the range of a certain depth from the surface);

(3) to obtain parallel, non-warp surfaces.

Depending on the material of the work, a suitable materials as the abrasive is selected. Usually, white alumina, brown alumina-zirconia composite, plate alumina, silicon carbide and so on are used.

Powders of white alumina, brown alumina-zirconia composite and silicon carbide are produced by milling the fused ingot of raw materials and classifying thereof, and the shapes of grains are not uniform. On the other hand, plate alumina powder is obtained by milling a monocrystal agglomerate obtained by calcinating aluminum hydroxide produced in a wet process at relatively low temperature. Grains thereof have a flat-plate like shape of hexagonal monocrystal so that it is called plate alumina.

The performance of the abrasive powder used in the lapping process is characterized not only in its hardness, fexibility and grain shape, but also in grain size and distribution thereof. Among them, the hardness and flexibility are attributes depending on the kind of the material.

The influence of grain shape onto the lapping action is important. It is said that grains having non-spherical shape but flat shape with edges have a large grinding efficiency (removal rate). In this sense, plate alumina is generally larger in removal rate than milled powder of fused ingot.

Grain size is also one of the factors having the largest influence onto the performance of abrasive powder. If grain size is large, the removal rate becomes large, but the energy of abrasive grains given onto the surface becomes large. Accordingly, there occurs a problem that defects produced at the time of lapping are increased and the sub-surface damage layer becomes deeper. On the contrary, if grain size is too small, the removal rate is too small to use.

As described above, in the case of the same material, the removal rate and the quality of the surface (defects, depth of sub-surface damage and so on) almost depend on the grain shape and grain size, but the removal rate and the surface quality are mutually inconsistent factors. It is therefore necessary to seek the most suitable grain shape and size so as to provide a good balance therebetween.

Further, the commercially produced abrasive powder in practice has size distribution so that it includes from fine grains to coarse grains. Therefore, the size distribution is also an important problem. Grains having too large size must be restricted severely because they cause scratches. In addition, fine grains which do not contribute to grinding are not only unnecessary, but also harmful in some cases.

U.S. Pat. No. 5,277,702 discloses plate alumina powder having a sharp distribution suitable to use mainly in lapping a silicon wafer, and discloses a method of producing such plate alumina powder. In this U.S. Pat., it is described that the production of fine grains; in milling is suppressed by improving the method of milling to thereby obtain powder having only a small number of fine grains or crushed pieces of primary grains. It is described that the reduction of fine grains decreases production of the defects or sub-surface damages in the lapping process. It is further described that the reason why the reduction of fine grains suppresses the defects or sub-surface damages in the lapping process is considered that in the case of plate alumina, the alumina grains flow in parallel with the lapped surface in the flow of the slurry, and if a lot of fine grains coexist, the fine grains lift up the edges of the plates to make them unbalanced so as to cause scratches, while the reduction of fine grains makes the flow of plates stable in the slurry to thereby make it possible to obtain a superior surface.

In the conventional lapping abrasives, efforts have been made in improving the raw materials, the method of milling, the method of classification so as to try to adjust the shape, average size and size distribution of the grains thereby to improve the performance. However, it is the fact that it is difficult to obtain a lapping abrasives which is satisfactory in balance between the removal rate and the quality of the surface.

Although the balance between the rate and the quality can be improved if the size distribution is made sharp so as to reduce the fine grains by repeating the number of times of the classification, the cost of production becomes higher correspondingly.

SUMMARY OF THE INVENTION

The present invention has been attained to solve the foregoing problems, and an object thereof is to obtain a lapping composition and a lapping method by which the rate and the quality of lapped surface can be improved.

The present invention provides a lapping composition consisting of a certain conventional plate alumina lapping powder as a "base" powder, and of adding a small quantity of plate alumina which is similar to the "base" powder but having slightly larger average grain size than that of the "base" powder. Consequently the balance between the lapping rate and the quality of the lapped surface is extremely improved; i.e. the lapping rate increased while the quality of the surface is equivalent to the conventional one. The present invention further relates to a lapping method using such a lapping composition mentioned above.

The concept of the present invention will be described. As generally known in using plate alumina as abrasive powder, it can be considered that plate-like alumina grains flow in parallel with the surface to be lapped. If this flow gets unstable, the edges of plates are lifted up so as to be unstable to cause scratches or sub-surface damages. In accordance with this theory, the present inventors made various trials to keep plate alumina grains not disturbed in the stable state in lapping process, i.e., in parallel to the surface to be lapped. As the result of trials, the inventors have found that it is possible to obtain a lapping composition superior in the balance between the rate and the quality of surface by addition of a small quantity of plate alumina of larger grain size.

For example, the lapping rate is improved by 30% at the maximum in comparison with the "base" plate alumina lapping powder, while defects or depth of sub-surface damages is at the same level with the "base".

Thus, the inventors have achieved the present invention.

DESCRIPTION OF THE PREFERRED EMBODIMENTS

Prior to the description of the present invention, the terms of analytical and measuring equipments and a measuring method which are used in the description will be described.

MEASUREMENT OF GRAIN SIZE DISTRIBUTION

The numerical value of grain size distribution often changes in accordance with the measuring method thereof. It is therefore necessary to strictly define the equipment to be used and conditions therefor. In the description of this specification, all the grain size distribution was measured by use of COULTER COUNTER TA-2 made by COULTER CO. with a small hole diameter of 70 μm. Average grain size and grain size distribution are expressed by D3 end so on. For example, D3 means the grain size (μm) corresponding to 3% in weight from the coarse side, and so forth. Accordingly, D50 means intermediate grain size which is defined as the average grain size.

LAPPING TEST (1) Silicon Wafer

Lapping test was performed with 4-inch φ wafers by use of SPEED FAM DSL9B made by SPEED FAM CO. The slurry for lapping was composed of 600 g of abrasive powder, 60 ml of lapping oil P-71 and 3,000 ml of water. Lapping was performed under with load of 100 g/cm$^2$ and rotational speed of 60 rpm.

(2) Quartz

Works of 13 mm φ are lapped by use of 4B lapping machine made by HAMAI Go., Ltd. The lapping slurry was composed of 1 kg of abrasive powder, 5,000 ml of water with no lapping oil. Lapping was performed with load of 120 g/cm$^2$ and rotational speed of 53 rpm.

(3) Blue Plate Glass

A work of 25 mm×25 mm was lapped by use of 4B lapping machine made by HAMAI Go., Ltd. The lapping slurry was composed of 200 g of abrasive powder, 20 ml of lapping oil P-71 and 1,000 ml of water. Lapping was performed with load of 130 g/cm$^2$ and rotational speed of 53 rpm.

(4) Soft Steel

A work of 25 mm×25 mm was lapped by use of 4B lapping machine made by HAMAI Co., Ltd. The lapping slurry was composed of 600 g of abrasive powder 60 g of lapping oil HST-1 and 2,940 ml of water. Lapping was performed with load of 120 g/cm$^2$ and rotational speed of 53 rpm.

MEASUREMENT OF SURFACE ROUGHNESS

Measurement was performed by use of profilometer SE-30H made by KOSAKA Laboratory, and the result was shown by Ra.

MEASUREMENT OF DEPTH OF SUB-SURFACE DAMAGE

By use of SPW polishing machine made by SPEED FAM CO., a lapped surface was polished it by bit with a cross surface plate and a polishing slurry. Thickness was measured when the surface was polished to an extent that pits in the surface visually disappeared, and the reduction of the thickness was regarded as the depth of a sub-surface damage.

EXAMPLES 1 TO 11

MNY plate alumina made by LONZA CO. was milled with ATTRITOR made by MITSUI CO. and classified in a wet method to thereby obtain powders respectively having average grain sizes of 4.5 μm, 2.8 μm, 9.6 μm, 11.8 μm, 14.0 μm and 40.0 μm.

Thus obtained powders were respectively added to PWA-3 (plate alumina lapping powder having average grain size of 3.0 μm made by FUJIMI Inc.), PWA-9 (the same but having average grain size of 6.0 μm), PWA-11 (the same but having average grain size of 6.6 μm), and PWA 10 (the same but having average grain size of 30.0 μm), by a quantity in a range from 0.3% to 15%, and then lapping test was performed on those compositions.

The works used in the tests were quartz for PWA-3, silicon wafer for PWA-9 and PWA-11, and blue plate glass and soft steel for PWA-40.

The lapping rate, the surface roughness of the lapped works, the depth of the sub-surface damage were measured. Table 1 shows the results of measurement.

REFERENCE 1 TO 5

Nothing was added to PWA-3, PWA-9, PWA-11 and PWA-40, and lapping test was performed thereon in the similar way to the above Examples. Used works were the same as those in the above Examples correspondingly. The lapping rate, the surface roughness of the works, the depth of sub-surface damage were measured. Table 1 shows the results of measurement.

EXAMPLE 12

The grain size distributor of powder mixture obtained in Example 6 and the grain size distribution of PWA-11 (Reference 3) which was a "base" thereof were measured, and the results thereof are shown in Table 2.

TABLE 1

| | (a) abrasive powder as a base | | (b) added powder | | ratio of D50 of (b) to D50 of (a) | lapped subject (works) | removal rate μm/5 min | surface roughness Ra | depth of sub-surface damage μm |
|---|---|---|---|---|---|---|---|---|---|
| | PWA-number | D50 μm | D50 μm | addition to (a) % | | | | | |
| Example | | | | | | | | | |
| 1 | 3 | 3.0 | 4.5 | 1.0 | 1.50 | quartz | 13.1 | 0.115 | — |
| 2 | 9 | 6.0 | 7.8 | 0.3 | 1.30 | silicon | 31.1 | 0.277 | 10.6 |

TABLE 1-continued

| | (a) abrasive powder as a base | | (b) added powder | | ratio of D50 of (b) to D50 of (a) | lapped subject (works) | removal rate μm/5 min | surface roughness Ra | depth of sub-surface damage μm |
|---|---|---|---|---|---|---|---|---|---|
| | PWA-number | D50 μm | D50 μm | addition to (a) % | | | | | |
| 3 | 9 | 6.0 | 11.8 | 0.3 | 1.97 | silicon | 33.2 | 0.295 | 10.8 |
| 4 | 9 | 6.0 | 11.8 | 1.0 | 1.97 | silicon | 34.0 | 0.263 | 10.2 |
| 5 | 9 | 6.0 | 14.0 | 0.3 | 2.33 | silicon | 33.8 | 0.246 | 11.0 |
| 6 | 11 | 6.5 | 9.6 | 1.0 | 1.48 | silicon | 38.3 | 0.252 | 10.5 |
| 7 | 11 | 6.5 | 9.6 | 6.0 | 1.48 | silicon | 43.2 | 0.270 | 10.6 |
| 8 | 11 | 6.5 | 9.6 | 10.0 | 1.48 | silicon | 42.2 | 0.280 | 10.5 |
| 9 | 11 | 6.5 | 9.6 | 15.0 | 1.48 | silicon | 44.5 | 0.320 | 11.3 |
| 10 | 40 | 30.0 | 40.0 | 1.0 | 1.33 | blue plate glass | 385 | 1.75 | — |
| 11 | 40 | 30.0 | 40.0 | 1.0 | 1.33 | soft steel | 11.5 | 1.20 | — |
| Reference | | | | | | | | | |
| 1 | 3 | 3.0 | — | — | — | quartz | 10.8 | 0.093 | — |
| 2 | 9 | 6.0 | — | — | — | silicon | 29.3 | 0.285 | 10.6 |
| 3 | 11 | 6.5 | — | — | — | silicon | 32.9 | 0.242 | 10.9 |
| 4 | 40 | 30.0 | — | — | — | blue plate glass | 342 | 1.76 | — |
| 5 | 40 | 30.0 | — | — | — | soft steel | 10.1 | 1.12 | — |

TABLE 2

| grain size | [weight distribution] | |
|---|---|---|
| | differential | accumulation |
| grain size distribution of powder of Example 6 D50 = 6.42 | | |
| 1.26–1.59 | 0.0 | 100.0 |
| 1.59–2.00 | 0.1 | 100.0 |
| 2.00–2.52 | 0.2 | 99.8 |
| 2.52–3.17 | 0.6 | 99.7 |
| 3.17–4.00 | 3.8 | 99.1 |
| 4.00–5.04 | 13.8 | 95.3 |
| 5.04–6.35 | 29.7 | 81.5 |
| 6.35–8.00 | 36.5 | 51.8 |
| 8.00–10.1 | 12.5 | 15.3 |
| 10.1–12.7 | 2.7 | 2.8 |
| 12.7–16.0 | 0.2 | 0.2 |
| 16.0–20.2 | 0.0 | 0.0 |
| 20.2–25.4 | 0.0 | 0.0 |
| 25.4–32.0 | 0.0 | 0.0 |
| 32.0–40.3 | 0.0 | 0.0 |
| 40.3–50.8 | 0.0 | 0.0 |
| grain size distribution of powder (PWA-11) of Reference 3 D50 = 6.37 | | |
| 1.26–1.59 | 0.0 | 100.0 |
| 1.59–2.00 | 0.1 | 100.0 |
| 2.00–2.52 | 0.1 | 99.9 |
| 2.52–3.17 | 0.6 | 99.8 |
| 3.17–4.00 | 3.9 | 99.2 |
| 4.00–5.04 | 14.1 | 95.2 |
| 5.04–6.35 | 30.4 | 81.1 |
| 6.35–8.00 | 36.5 | 50.7 |
| 8.00–10.1 | 12.3 | 14.3 |
| 10.1–12.7 | 2.0 | 2.0 |
| 12.7–16.0 | 0.0 | 0.0 |
| 16.0–20.2 | 0.0 | 0.0 |
| 20.2–25.4 | 0.0 | 0.0 |
| 25.4–32.0 | 0.0 | 0.0 |
| 32.0–40.3 | 0.0 | 0.0 |
| 40.3–50.8 | 0.0 | 0.0 |

As shown in these results, addition of even a small amount of plate alumina powder having grain size larger than that of the base powder, will increase the lapping rate remarkably. Although there is a slight fluctuation in the surface roughness Ra, the depth of sub-surface damage layer is not changed. Therefore, it can be recognized that there is no influence to the polishing in the following process. The performance of the lapping was improved obviously so much as the lapping rate was increased. Accordingly, the time necessary for the process of lapping is reduced, so that the lapping composition according to the present invention gives a large effect on the efficiency and cost.

In addition, from the results of Example 12, it is apparent that improvement in the present invention is characterized by the grain size distribution increased in coarse side.

That is, the powder in Example 6 have 2.7% and 0.2% by weight of fractions for ranges of 10.1–12.7 μm and 12.7–16.0 μm respectively, while the powder in reference 3 have 2.0% for 10.1–12.7 μm and no fraction for 12.7–16.0 μm. Accordingly, it is apparent that this coarse portion, even with a small volume, contributes to the improvement of the lapping rate. In other words, the coarse fraction whose grain size larger than the value corresponding to two times of the average grain size, even at 0.2% by weight will be the indication of the effect of the present invention.

What is claimed is:

1. A lapping composition comprising a mixture of a base powder of plate alumina and a second powder of plate alumina, the base powder consisting of plate alumina that has been milled and classified to form a powder having a first average grain size, said second powder consisting of plate alumina that has been milled and classified to form powder having a second average grain size, the average grain size of the second powder being about 1.3 to 2.33 times greater than the average grain size of the base powder, the second powder being present in the mixture in an amount of between about 0.3–15% by weight of the base powder.

2. A lapping composition according to claim 1 wherein, prior to being milled and classified, the plate alumina of the base powder is formed into a sintered body by calcining aluminum hydroxide.

3. A lapping composition according to claim 2 wherein the average grain size of the base powder is between about 3 μm and 30 μm as measured with a Coulter counter TA-2.

* * * * *